INVENTOR.
ALFRED G. TONNESSEN
BY Allan Ratner
ATTORNEY

INVENTOR.
ALFRED G. TONNESSEN
BY Allan Ratner
ATTORNEY

INVENTOR.
ALFRED G. TONNESSEN
BY
Allan Ratner
ATTORNEY

United States Patent Office 3,412,342

Patented Nov. 19, 1968

3,412,342

AMPLIFIER SYSTEM FOR COMPENSATION OF UNDESIRED CAPACITANCE AND RESISTANCE EFFECTS

Alfred G. Tonnessen, Neptune, N.J., assignor to Electronic Associates Inc., Long Branch, N.J., a corporation of New Jersey Filed May 16, 1966, Ser. No. 550,356
10 Claims. (Cl. 330—76)

ABSTRACT OF THE DISCLOSURE

A.C. compensation of an amplifier for distributed wiring capacitance and leakage resistance is accomplished by utilizing a positive feedback network including a plurality of A.C. networks so valued that the alternating current required to charge the distributed capacitance through the leakage resistances comes from the A.C. networks rather than from other sources.

This invention relates to extending the bandwidth of amplifiers and more particularly to providing A.C. compensation for direct coupled amplifiers.

Direct coupled amplifiers are known in the art to have many uses. For example, in analog computers, the direct coupled amplifier may be used as a computing element and as a part of a readout system. An analog computer also comprises other types of computing elements which are interconnected in accordance with a program to stimulate the behavior of a dynamic system. With the computing elements interconnected, it may be desired to read out the results produced by various ones of the computing elements. Specifically, prior analog computers have utilized relay systems to selectively connect the output terminals of computing elements in turn to a voltage readout system comprising at least one direct coupled readout amplifier. As well known by those skilled in the art, many computing elements (such as potentiometers) may have a relatively high D.C. and A.C. output impedance. When a high impedance output of a computing element is connected to the amplifier, it is subjected to loading by the amplifier thereby producing erroneous output readings. These erroneous readings are caused by current flow between the high impedance source and the input of the direct coupled amplifier, producing potential drops. In order to prevent such erroneous readings, amplifiers have been provided with positive feedback and a gain greater than one. In this manner, current supply to the input of the amplifier comes from the positive feedback circuit and thus no current flows from the high impedance computing element. Thus, the effective D.C. input impedance of the amplifier is extremely high as for example, in the thousands of megohms. This compensation has been called in the art "D.C. unloading."

However, the D.C. unloading circuit does not compensate for the distributed wiring capacitance and the leakage resistance which are produced particularly in the connections and wiring between the computing elements and the readout amplifier. The combination of the distributed capacitance and the leakage resistance produces a relatively high time constant RC circuit. Thus, when a computing element having a high A.C. output impedance is initiatively connected to the direct coupled amplifier the applied signal wavefront is required to charge the distributed capacitance through the leakage resistance. Instead of a sharp wavefront being applied to the readout amplifiers, the bottom of the leading edge of a square wave, for example, is substantially rounded. In this manner, a substantial delay is produced in the readout.

Accordingly, an object of the present invention is the

A.C. compensation of a direct coupled amplifier for distributed wiring capacitance and leakage resistance.

Another object of the invention is an A.C. unloading circuit for a readout direct coupled amplifier to substantially reduce readout delay.

In accordance with the invention, there is provided a direct coupled amplifier having positive feedback and a D.C. gain greater than one to produce D.C. unloading. Additionally, the positive feedback network includes a plurality of A.C. networks producing an A.C. gain greater than one to compensate for the distributed wiring capacitance. The networks are of value so that A.C. current required to charge the distributed capacitance through the leakage resistances comes from the A.C. compensating networks rather than from the computing elements whose output is being read out. In this manner, A.C. compensation is provided for the amplifier thereby extending its effective bandwidth.

For further objects and advantages of the invention and for a description of its operation, reference is to be had to the following detailed description taken in conjunction with the accompanying drawings in which:

FIG. 1 schematically illustrates a system embodying the invention;

Figure 1:
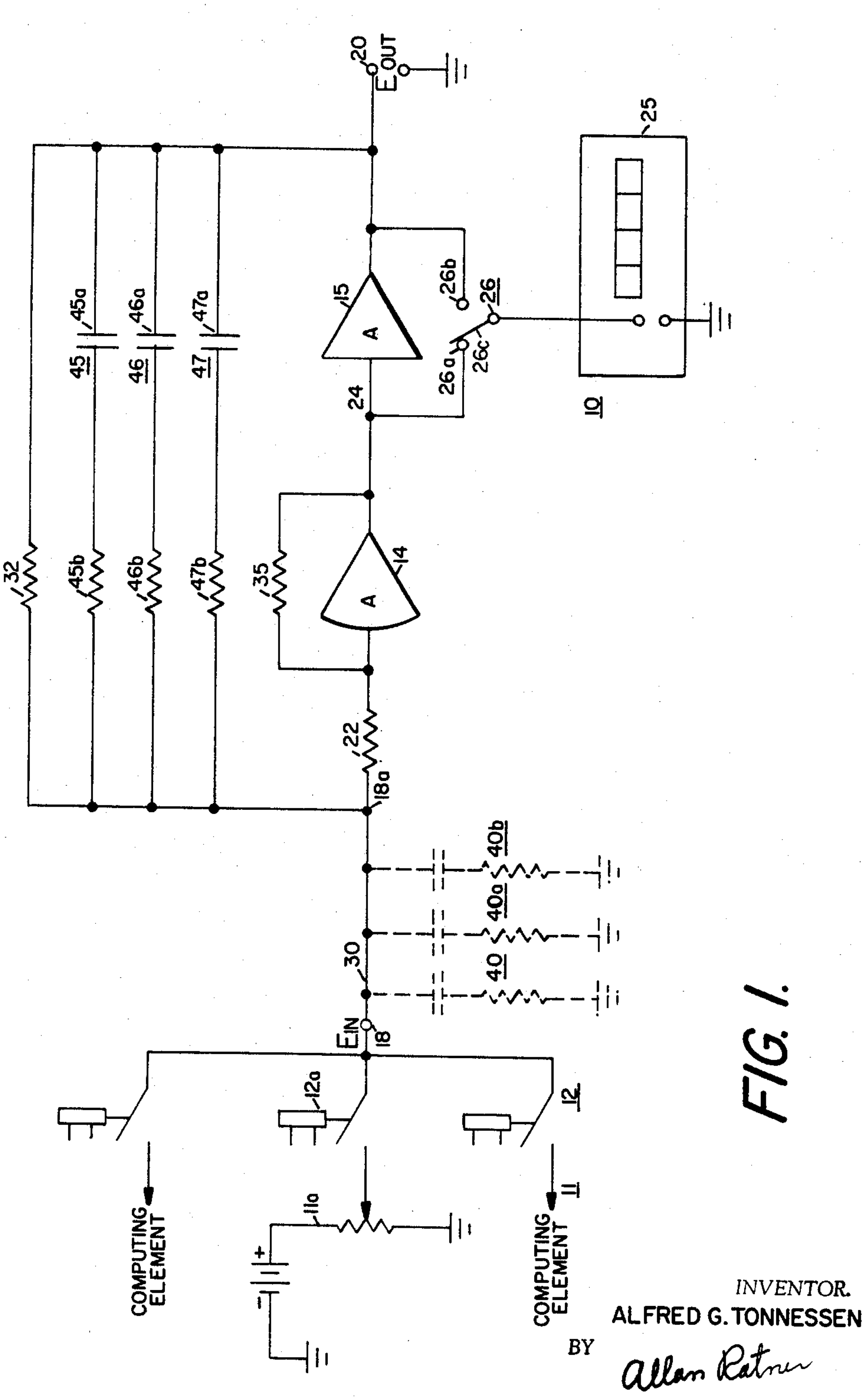

Referring now to FIG. 1, there is shown a voltage readout system 10 for an analog computer for reading out the output voltages of analog computing elements 11 by way of a relay system 12. Relay systems 12 for selectively connecting the outputs of computing elements in turn to a readout system for example in U.S. patent application Ser. No. 455,470, filed May 13, 1965, entitled Readout System, assigned to the same assignee as the present invention.

The relays 12 are each selectively energized to apply the output signal of its respective computing element 11 to a conductor 30 leading to an input terminal 18*a* of the readout system. For example, relay 12*a* may be energized to activate the relay contact thereby to connect the movable contact of the potentiometer to conductor 30. In this manner, a digital voltmeter 25 of the readout system 10 indicates the value of the output of potentiometer 11*a*.

Figure 5:
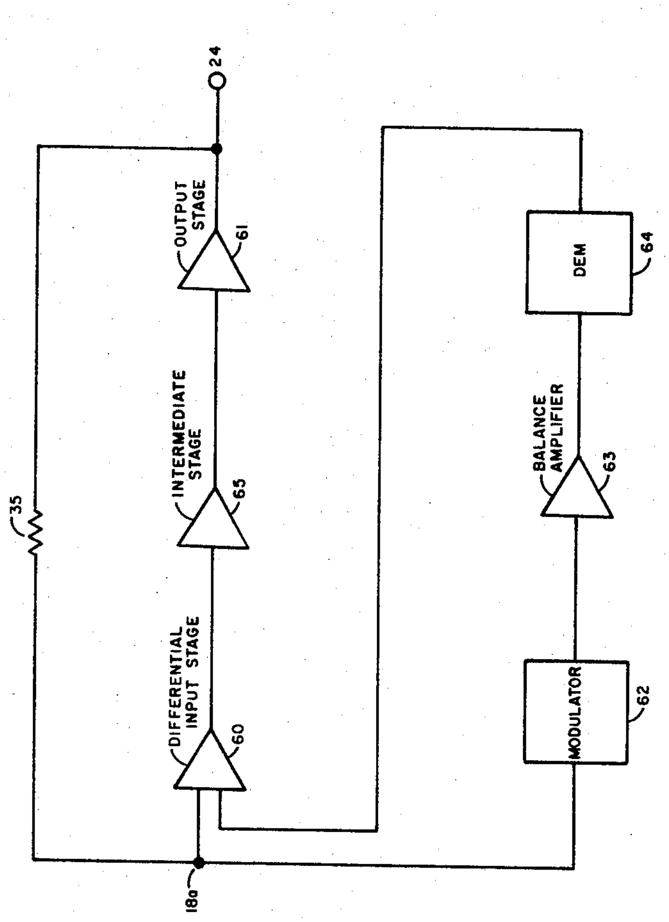
FIGURE 5 PRIOR ART
FIG. 5 is a block diagram of a stabilized operational amplifier useable in the present invention.

The voltage system 10 comprises two drift stabilized direct coupled amplifiers 14 and 15 (operational amplifiers) as shown for example in U.S. Patent No. 3,081,435 represented in block diagram form in FIGURE 5. Such amplifiers may be considered an amplifier system comprising a multistage direct coupled amplifier having at least an input stage 60 and an output stage 61, and may also include an intermediate stage 65, if desired. The input stage is connected to a summing junction 18*a* and the output stage to an output terminal 24. In addition, in such direct coupled amplifiers, a balance amplifier 63 is coupled between the summing junction and an input stage. Such amplifiers also include a modulator and demodulator shown at 62 and 64 respectively. It will be understood that blocks 60–65 and an appropriate feedback resistor may be used as each of the amplifiers 14 and 15. Amplifiers 14 and 15 are each of the inverting type and connected in series so that a signal applied to the readout system input terminal 18 appears noninverted at the output terminal 20. Specifically, input terminal 18 is connected by way of input conductor 30, terminal 18*a*, a first amplifier input resistor 22, amplifier 14, conductor 24, amplifier 15 to the readout system output terminal 20.

Digital voltmeter 25 is adapted to read the absolute value of the input signal voltage applied to the readout system 10. Accordingly, there is provided a reversing switch 26 having a first contact **26*a* connected to the input of inverting amplifier 15 and a second contact 26*b* connected to the output of amplifier 15. As indicated by its block diagram, amplifier 15 includes therein an input resistor and feedback resistor with the circuit elements selected to provide a gain of one. Thus, the output of amplifier 15** is equal in amplitude to its input though opposite in sign.

In operation with the relay **12*a* energized there is applied a positive going signal from potentiometer 11*a* to the input terminal 18. Thus, the signal at conductor 24 is in a negative going direction and is applied to voltmeter 25 by way of selector switch 26 which in its illustrated position with switch arm 26*c* engaging contact 26*a*. It is assumed that digital voltmeter 25 is actuated by negative-going signals and thus reads the absolute value of the input signal applied to terminal 18. On the other hand, if the input signal applied to terminal 18 is in a negative going direction, switch 26 is actuated so that arm 26*c* engages contact 26*b* and digital voltmeter 25** reads the absolute value of the input signal.

As well understood by those skilled in the art, potentiometer **11*a* is a substantially high impedance analog device for both D.C. and A.C. and current may flow from that high impedance device through resistor 22 into amplifier 14 thereby causing impedance drops and producing erroneous readings in the digital voltmeter 25. Accordingly, readout amplifiers 14 and 15 are provided with a D.C. unloading circuit in which positive feedback is applied by way of output terminal 20 and through positive feedback resistor 32 to the amplifier input terminal 18*a*, as shown for example at page 335, "The Design and Use of Electronic Analogue Computers," by C. P. Gilbert, Chapman & Hall, Ltd., 1964. The circuit amplifier elements are selected so that the gain of the amplifier system comprising amplifiers 14 and 15 is greater than one. In this manner, any current supplied to amplifier 14 comes from the positive feedback circuit and not from device 11*a* being read out. Thus, there is provided an effective input impedance for the readout system 10** of an extremely high value as for example in the thousands of megohms.

Figure 2:
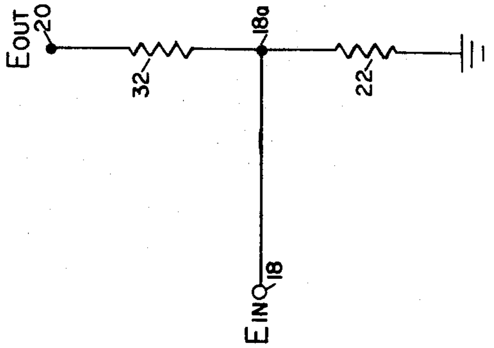

In order to achieve a gain greater than one for the amplifier system as for example 1.1, the value of feedback resistor 32 may be 100 kilohms while input resistor 22 may be one megohm as shown in FIG. 2. FIG. 2 is an equivalent circuit for the amplifier system of FIG. 1 having the voltage-resistance equation $$\frac{E\text{ in}}{E\text{ out}}=\frac{R22}{R32+R22} \tag{1}$$

With the resistance values of the resistors of FIG. 2 substituted in Equation 1, it will be understood that the output voltage E out is equal to 1.1 times the input voltage E in which indicates a total overall loop gain of 1.1 for the amplifier system. With resistors 22 and 32 selected, negative feedback resistor 35 for amplifier 14 may be selected with respect to input resistor 22 to provide a gain for that amplifier equal to 1.1. It will be understood by those skilled in the art that there is now obtained a D.C. unloading circuit for in which the amplification of the system is limited by the full scale (high end) excursion of amplifiers 14 and 15 and is limited in the low end by the requirement that the offset be maintained. Thus, by the use of a D.C. unloading circuit there is produced an effective high impedance input at terminal 18 for readout system 10.

Figure 3:
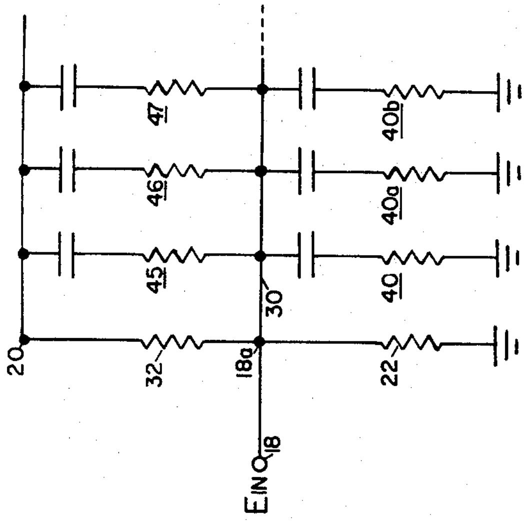
FIGS. 2 and 3 illustrate equivalent circuits of the system of FIG. 1.

In a practical wiring circuit of an analog computer there may be a substantially long wiring distance between relay system 12 and the readout system 10. Specifically, lead 30 may be a substantially long conductor thereby producing a substantial distributed wiring capacitance and a substantial leakage resistance from differing analog computing elements to ground. In this manner, there is distributed capacitance to such elements and then to ground to provide a combination of distributed capacitance and leakage resistance. Several capacitance-resistance combinations are shown in FIG. 1 and indicated at **40–40*b*. The equivalent of these resistance capacitance combinations are illustrated in FIG. 3 between conductor 30** to ground.

It will be understood that when relay **12*a* is energized and its contact closes and when the relay 12*a* is deenergized and its contact opens a sharp wave front travels from computing element 11*a*, relay contact 12*a* toward input terminal 18 and through conductor 30 to terminal 18*a*. With the computing element being a high A.C. output impedance device and as a result of the combined distributed capacitance and leakage resistance 40–40*b*, the leading edge of the square wave is substantially rounded thereby substantially delaying the reading on voltmeter 25. For example, a negative going square wave may be applied to input terminal 18 as shown in FIG. 4A. At the time of the initial application of the square wave, time $t_0$, the capacitances 40–40*b* appear as short circuits and then each begin charging according to the time constant of its particular RC network. Thus, the bottom of the leading edge 42 within the dotted line circle is rounded by the charging of the combination capacitance and resistance networks 40–40*b*. This rounding of the bottom edge is shown in detail in FIG. 4B which illustrates the wavefront at terminal 18*a*** within the dotted circle of FIG. 4A.

In accordance with the invention in order to compensate for this charging time, there is provided a plurality of A.C. compensating networks 46–47 each of which includes a series resistance capacitance circuit. Each of the compensating networks 45–47 is connected in shunt with the feedback resistor 32 between the output terminal 20 and input terminal **18*a* as shown in FIGS. 1 and 3. In this way, A.C. feedback is provided with the networks being selected so that the current required to charge the distributed capacitance through the leakage resistance comes from the compensating networks 45–47 rather than from the computing elements such as the potentiometer being read out. Since the distributed capacitance and the leakage resistance cannot practically be measured, a first compensating network 45 is selected to be of value so that capacitor 45*a* and resistor 45*b* provide an RC conduit to change the wave shape 42 to product a resultant wave shape 50 as shown in FIG. 3. Specifically, between times $t_0$ and $t_1$ network 45** produces a current to charge the distributed capacitance.

Figure 4B:
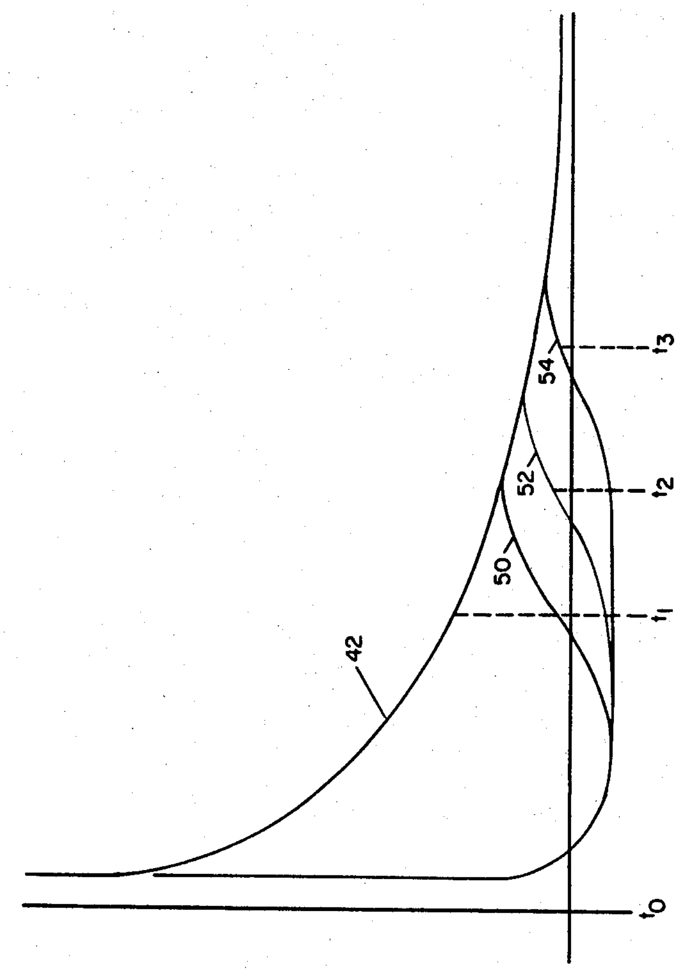
FIGS. 4A and 4B illustrate waveforms useful in explaining the operation of FIG. 1.
Figure 4A:
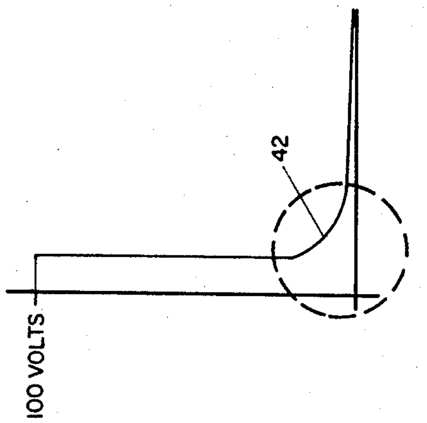

In similar manner, compensating network 46 comprising capacitor **46*a* and resistor 46*b* are selected to provide a different RC time constant to produce a resultant waveshape 52 shown in FIG. 4B. Similarly, compensating network 47 comprising capacitor 47*a* and resistor 47*b* are selected to produce an RC time constant to provide a resultant wave shape 54. More particularly, between times $t_1$ and $t_2$, network 46 produces a current to charge the distributed capacitance and between times $t_2$ and $t_3$, network 47 produces a current to charge the distributed capacitance. Thus, each of the A.C. compensating networks 45–47 operates at a different time to provide a resultant waveshape which is substantially square. Specifically, the waveshape 42 has been modified between each of these time durations to produce waveforms 50, 52 and 54** which when combined provide a substantially square waveshape.

In accordance with the invention, the A.C. gain is greater than one and it is preferred that the A.C. gain be equal to the D.C. gain. By the use of the foregoing positive feedback a substantially sharp wavefront is produced so that the digital voltmeter 25 provides a rapid and accurate reading of the output voltage of the high A.C. output impedance computing element **11*a***.

It will be understood that computing elements other than potentiometers may have a high A.C. output impedance and thus require A.C. unloading. For example, operational amplifiers may provide a high A.C. output impedance.

Now that the principles of the invention have been explained, it will be understood that many modifications may be made therein without departing from the scope of the invention as defined by the appended claims.

For example, additional A.C. compensating networks may be provided in order to more completely flatten the squarewave of the input signal. Each compensating network is connected in shunt with feedback resistor 32 and is selected in the manner described above to effectively operate at differing time intervals.

What is claimed is:

1. A direct coupled amplifier system having positive A.C. feedback to compensate for capacitance charging circuits connected to its input comprising an input resistor connected to said input of said amplifier system, a feedback resistor connected between said input and an output of said amplifier system to provide positive feedback for said amplifier system, said feedback resistor and said input resistor being selected of resistance value to provide D.C. gain for said system greater than one thereby providing D.C. unloading for said system, and resistance-capacitance compensating networks connected between said input and said output of said system to provide positive A.C. feedback current for charging said input capacitance circuits, said compensating networks each being of differing resistance-capacitance values to provide differing time constants to produce charging currents at differing times upon application of an input signal to said amplifier system.

2. The direct coupled amplifier system of claim 1 in which said compensating networks each comprise a resistor in series circuit relation with a capacitor and each of said compensating series circuits being connected between said input and said output of said amplifier system.

3. The direct coupled amplifier system of claim 2 in which there is provided an A.C. high impedance source having connections to said input for supplying said input signal to said amplifier system and in which said capacitance charging circuits are distributed and leakage resistance provided by said connections.

4. The direct coupled amplifier system of claim 3 in which said resistor and said capacitor in each of said compensating series circuits are of value to produce a current to charge said distributed capacitance through the leakage resistance during a predetermined time duration, each of said time durations of said series circuits begin at different times after the application of an input signal.

5. The direct coupled amplifier system of claim 3 in which there is provided at least two stabilized direct coupled amplifiers each comprising a summing junction and an output terminal, a multistage direct coupled amplifier having at least an input stage and an output stage, means connecting said input stage to said summing junction and said output stage to said output terminal, a feedback circuit connected between said output terminal and said summing junction, and a balancing amplifier coupled between said summing junction and said input stage.

6. A system for reading out the computing elements of an analog computer having a readout direct coupled amplifier system in which capacitance charging circuits are connected to the input of said amplifier system comprising an input terminal for said readout system connected to an input of said amplifier system, an input resistor connected between said input terminal and said amplifier system input, a feedback resistor connected between said input terminal and an output of said amplifier system to provide positive feedback for said amplifier system, said feedback resistor and said input resistor being selected of resistance values to provide D.C. gain for said system greater than one thereby providing D.C. unloading for said system, said amplifier system including a readout device for providing a readout indication of the output value of a computing element connected to said amplifier system, and resistance-capacitance compensating networks connected between said input terminal and said output of said amplifier system to provide positive A.C. feedback for charging said input capacitance circuits, said compensating networks each being of differing resistance-capacitance values to provide currents to charge said capacitance charging circuits during differing time durations upon application of an input signal to said readout system.

7. The readout system of claim 6 in which said compensating networks each comprise a resistor in series circuit relation with a capacitor and each of said compensating series circuits being connected between said input terminal and said output of said amplifier system.

8. The readout system of claim 7 in which said direct coupled amplifier system comprises at least two stabilized direct coupled amplifiers each comprising a multistage direct coupled amplifier having at least an input stage and an output stage, means connecting said input stage to a summing junction and said output stage to an output terminal, a feedback circuit connected between said output terminal and said summing junction, and a balancing amplifier coupled between said summing junction and said input stage.

9. The readout system of claim 8 in which a plurality of said computing elements each have a high A.C. output impedance, means connecting said computing elements in turn to said input terminal of said amplifier system, and in which said capacitance charging circuits are distributed capacitance and leakage resistance provided by the connection means between the computing elements and said input terminal.

10. The readout system of claim 9 in which said resistor and said capacitor in each of said compensating network series circuits is of value to produce a current to charge said distributing capacitance through the leakage resistance during a predetermined time duration and each of said time durations of said series begin at differing times after the application of an input signal.

References Cited

UNITED STATES PATENTS 3,299,367 1/1967 Howden ---------- 330—76 X

FOREIGN PATENTS 901,047 7/1962 Great Britain.

ROY LAKE, *Primary Examiner.*

J. B. MULLINS, *Assistant Examiner.*